(12) United States Patent
Hart et al.

(10) Patent No.: US 8,331,312 B2
(45) Date of Patent: Dec. 11, 2012

(54) SCHEDULING OF ISOCHRONOUS TRAFFIC IN TIME AND FREQUENCY TO REDUCE CONTENTION

(75) Inventors: Brian D Hart, Sunnyvale, CA (US); Neil R Diener, Hudson, OH (US); Lu Qian, Solon, OH (US)

(73) Assignee: Cisco Technology, Inc., San Jose, CA (US)

( * ) Notice: Subject to any disclaimer, the term of this patent is extended or adjusted under 35 U.S.C. 154(b) by 369 days.

(21) Appl. No.: 12/710,446

(22) Filed: Feb. 23, 2010

(65) Prior Publication Data

US 2011/0205998 A1 Aug. 25, 2011

(51) Int. Cl.
*H04W 4/00* (2009.01)
(52) U.S. Cl. ......... 370/330; 370/468; 370/338; 455/450
(58) Field of Classification Search .................... None
See application file for complete search history.

(56) References Cited

U.S. PATENT DOCUMENTS

| | | | | |
|---|---|---|---|---|
| 6,891,821 B2* | 5/2005 | Krishnakumar et al. | ..... | 370/343 |
| 2002/0071445 A1* | 6/2002 | Wu et al. | ....... | 370/441 |
| 2003/0161340 A1* | 8/2003 | Sherman | ....... | 370/445 |
| 2004/0001462 A1* | 1/2004 | Yavuz et al. | ....... | 370/333 |
| 2007/0211749 A1* | 9/2007 | Benveniste | ....... | 370/445 |

OTHER PUBLICATIONS

Vasilios A. Siris et al., "Resource Control for the EDCA and HCCA Mechanisms in IEEE 802.11e Networks," Modeling and Optimization in Mobile, Ad Hoc and Wireless Networks, 2006 4th International Symposium on; Aug. 7, 2006, pp. 1-6.

* cited by examiner

*Primary Examiner* — Bob Phunkulh
(74) *Attorney, Agent, or Firm* — Edell, Shapiro & Finnan, LLC

(57) ABSTRACT

Techniques are provided to reduce contention (interference) between bursts associated with multiple isochronous traffic flows. Generally, the techniques involve, at a plurality of wireless access point devices and/or a plurality of wireless client devices in a wireless network, initiating bursts of wireless transmissions carrying isochronous traffic from wireless access point devices to their associated client devices and/or from wireless client devices to their respective wireless access point devices at start times that are scheduled so as to reduce a likelihood of interference between multiple bursts of wireless transmissions for different isochronous traffic flows.

29 Claims, 14 Drawing Sheets

Staggered transmission burst start times

*AP(BSS)2 and AP(BSS)5 are out of range of each other

| Wireless Controller | | APs |
|---|---|---|
| | WC sends control frames to APs with configuration parameters for staggered burst start times → 122 | APs start isochronous transmission bursts according to configuration parameters |

*AP(BSS)2 and AP(BSS)5 are out of range of each other

"Quiet" element used by APs to cause associated CDs to end transmission before staggered burst start time of own and neighboring APs

FIG. 12

| Superframe # | | 1 | | | | 2 | | |
|---|---|---|---|---|---|---|---|---|
| Subframe# | 1 | 2 | 3 | 4 | 1 | 2 | 3 | 4 |
| AP priority | | | | | | | | |
| P = 0 | 1 | 2,6 | 3,5 | U | 1 | 2,6 | 3,5 | U |
| P = 1 | 3,5 | 1 | 2,6 | U | 3,5 | 1 | 2,6 | U |
| P = 2 | 2,6 | 3,5 | 1 | U | 2,6 | 3,5 | 1 | U |

FIG. 13

| Superframe # | 1 | |
|---|---|---|
| Subframe # | 1 | 2 |
| AP1 has < 1 subframe of data | <TXOP1----------> | ... |
| AP1 sends data | <Data1-----><OH> | ... |
| AP3/5 do not contend | XX | ... |
| AP2 does contend | CC | ... |
| AP2 TXOP | <-TXOP2-> | ... |

US 8,331,312 B2

SCHEDULING OF ISOCHRONOUS TRAFFIC IN TIME AND FREQUENCY TO REDUCE CONTENTION

TECHNICAL FIELD

The present disclosure relates to wireless networks, and more particularly to reducing interference between wireless transmissions of isochronous traffic such as video and audio.

BACKGROUND

Transmission of isochronous traffic, such as video or audio, in wireless networks has relatively high quality of service (QoS) requirements, such as low packet loss rate, low latency or delay and low packet jitter. One cause of reduced QoS for isochronous traffic in wireless networks is collisions or interference between wireless transmission of isochronous traffic from multiple sources at the same time and on the same frequency channel. For example, downlink wireless transmissions from two or more wireless access point devices and/or uplink wireless transmissions from two or more wireless client devices may overlap in time and frequency. Reducing the likelihood of interference between multiple isochronous transmissions can greatly improve the QoS in wireless networks.

BRIEF DESCRIPTION OF THE DRAWINGS

FIGS. 12 and 13 illustrate examples of a superframe and subframe timing structure to reduce contention between isochronous flows from wireless network access point devices and/or client devices.

DESCRIPTION OF EXAMPLE EMBODIMENTS

Overview

Several techniques are disclosed herein to reduce contention (interference) between bursts associated with multiple isochronous traffic flows. Generally, the techniques involve, at a plurality of wireless access point devices and/or a plurality of wireless client devices in a wireless network, initiating bursts of wireless transmissions carrying isochronous traffic from wireless access point devices to their associated client devices and/or from wireless client devices to their respective wireless access point devices at start times that are scheduled so as to reduce the likelihood of interference between multiple bursts of wireless transmissions for different isochronous traffic flows. In one form, a controller apparatus communicates with the plurality of wireless access point devices and/or wireless client devices to receive from the wireless access point devices and/or wireless client devices messages indicating relatively long-lived isochronous traffic flows to be wirelessly transmitted from wireless access point devices to their associated client devices and/or from wireless client devices to their respective wireless access point devices. The controller apparatus determines which of the plurality of wireless access point devices and/or wireless client devices are in sufficient radio frequency proximity so as to interfere with each other. Based on the messages received from the wireless access point devices and/or wireless client devices concerning the isochronous traffic flows and the radio frequency proximity of wireless access point devices, the wireless controller apparatus generates schedule data representing the start times for wireless transmission bursts within each isochronous traffic flow from respective ones of the plurality of wireless access point devices and/or respective ones of the plurality of wireless client devices so as to reduce a likelihood of interference between multiple bursts of wireless transmission for different isochronous traffic flows. The wireless controller apparatus transmits control messages containing the schedule data to the plurality of wireless access point devices and/or wireless client devices.

Example Embodiments

Figure 1:
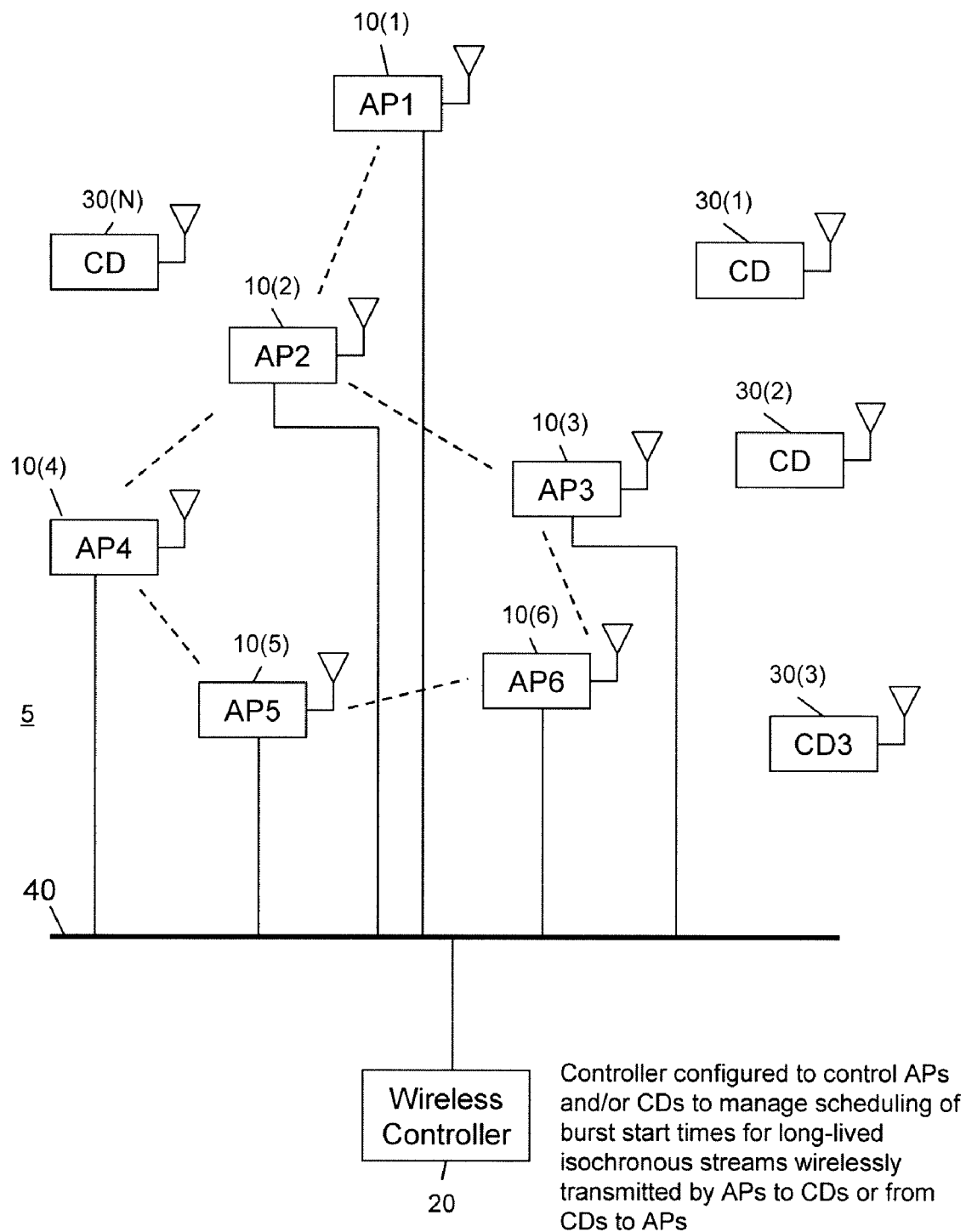
FIG. 1 is an example of a block diagram of a wireless network in which wireless network access point devices and/or wireless client devices are configured to initiate transmissions of isochronous bursts so as to reduce interference.

Reference is first made to FIG. 1 that shows a wireless network 5 comprising a plurality of wireless network access points (APs) and a plurality of wireless client devices (CDs) 30(1)-30(N). For example, FIG. 1 shows that there are six APs 10(1), 10(2), 10(3), 10(4), 10(5), and 10(6), though this is only by way of example; there may be more or less APs in a given wireless network deployment. These APs are also identified herein as AP1, AP2, AP3, AP4, AP5 and AP6, respectively. A wireless controller apparatus 20 provides high level control of the APs 10(1)-10(6). The APs 10(1)-10(6) are configured to serve wireless communications with the CDs 30(1)-30(N). The APs 10(1)-10(6) are, for example, configured to operate in a wireless local area network (WLAN) using the communication standard of IEEE 802.11, known commercially as WiFi™, or in a wireless network that uses the communication standard of IEEE 802.16, known commercially as WiMAX™.

The wireless controller 20 is, for example, a WLAN controller apparatus that is configured to control various functions of the APs 10(1)-10(6), such as the frequency channel used for operation, transmit power, etc. The controller 20 communicates with the APs 10(1)-10(6) via a wired network shown at reference numeral 40. However, it is also possible that the controller 20 is configured with wireless communication capability to communicate with the APs 10(1)-10(6) via a WLAN.

CDs become "associated" to an AP for wireless communications based on proximity, load conditions of an AP, etc. Once associated to an AP, that AP can send downlink transmissions carrying traffic intended for a CD and receive uplink transmissions carrying traffic from that CD. The APs 10(1)-10(6) may be configured to operate on one or more of a plurality of radio frequency (RF) channels in a frequency band. In some cases, the APs may be operating on the same channel, and in other cases, on different channels. When two or more APs are within sufficient RF proximity (that is, each AP can receive signals transmitted by the other AP) and are operating on a common (or even adjacent) frequency channel, there is a chance for interference between wireless transmissions from those two or more APs when they overlap, at least partially, in time. In other words, those APs can interfere with each other. In the foregoing, the term "neighbor" is used to refer to an AP that has sufficient RF proximity to another AP (and in one embodiment, including associated clients of the other AP) such that they could interfere with each other. Likewise, the CDs that are associated to an AP can have sufficient RF proximity to APs (and more accurately, their associated clients as well) other than its associated AP, so as to interfere with operation of those other APs (and clients) if it sends a transmission at the same time a neighbor AP (or client) is receiving a transmission to from one of its associated CDs (or AP).

The possibility for interference or collisions between transmissions of more than one AP and between transmissions of one or more CDs with one or more APs creates challenges when the transmissions carry isochronous traffic, such as voice or audio, and particularly when the isochronous traffic (a) comprises longer packets and (b) is long lived such that its lifetime is much greater than the latency of i) controller-to-AP (or client) communications and ii) AP (or client)-to-controller communications and iii) calculating, setting up and tearing down a schedule. The term "long-lived" means, for example, "longer than a few seconds".

According to the techniques described herein, in one embodiment, the wireless controller apparatus 20 is configured to control APs and/or CDs to manage scheduling of burst start times for isochronous traffic wireless transmitted on a downlink from APs to their associated CDs or on a downlink from CDs to their respected APs. The intelligence, in the form of software, for example, resides in the wireless controller apparatus 20. In other embodiments, the APs are configured to be autonomous in that they coordinate the schedule management of burst start times, either by virtue of a designated or selected AP that has sufficient processing capability, or through a distributed allocation of the necessary processing across multiple APs. Examples of these embodiments are described hereinafter. While FIG. 1 illustrates the wireless controller apparatus 20, this figure will be referred to hereinafter in connection with certain embodiments that do not require the processing and coordination to be made by the wireless controller apparatus 20.

Figure 2:
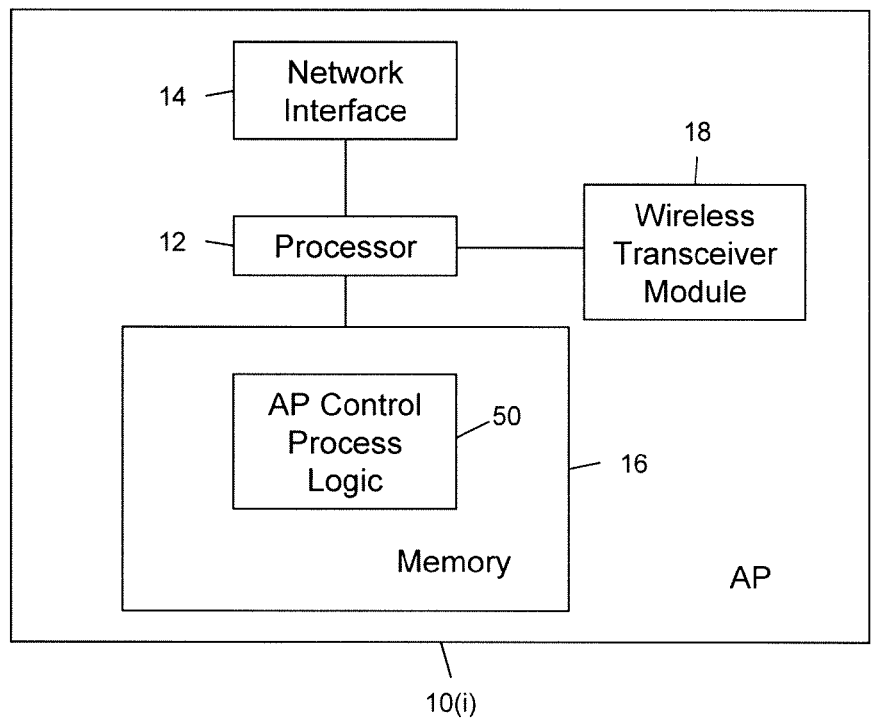
FIG. 2 is an example of a block diagram of a wireless network access point device configured to perform various contention reduction techniques described herein.

Reference is now made to FIG. 2 that shows an example of a block diagram of an AP, e.g., any of the APs shown in FIG. 1, and to this end, the AP shown in FIG. 2 is designated by the generic reference numeral 10(i). The AP 10(i) comprises a processor 12, a network interface unit 15, memory 16 and a wireless transceiver module 18. The processor 12 is, for example, a microprocessor or microcontroller that is programmable such that its functions are determined by instructions, stored in the memory 16, that the processor 12 executes. In other forms, the processor 12 may be an application specific integrated circuit (ASIC), or other fixed or programmable data processing device. The network interface unit 14 is a module that is configured to provide communications via the wired network 40 (FIG. 1) so that the AP can communicate with the wireless controller apparatus 20 or with other APs. For example, the network interface unit is an Ethernet card or module.

The memory 16 is a random access memory or a read only memory or other tangible computer or processor readable memory. The memory 16 is encoded or stores instructions for AP control process logic 50. The AP control process logic 50 is described further hereinafter in connection with various operations performed in an AP based on scheduling configuration parameters. The processor 12 executes the AP control process logic 50 to control the wireless transceiver module 18 in accordance with configuration parameters received by the AP from the wireless controller apparatus 20, for example, as explained hereinafter. The wireless transceiver module 18 is configured to perform the baseband and RF signal processing necessary to transmit wireless signals to CDs and receive wireless signals from CDs. The wireless transceiver module 18 is, for example, configured to perform the baseband and RF signal processing needed to transmit and receive signals in compliance with the IEEE 802.11 standards, or the IEEE 802.16 standards, or other standards now known or hereinafter developed.

A CD has a similar block diagram as that shown for an AP in FIG. 2. Insofar as a CD may be configured to participate in the contention reduction techniques described herein, the CD would also have control process logic similar to that shown at 50 in FIG. 2.

Figure 3:
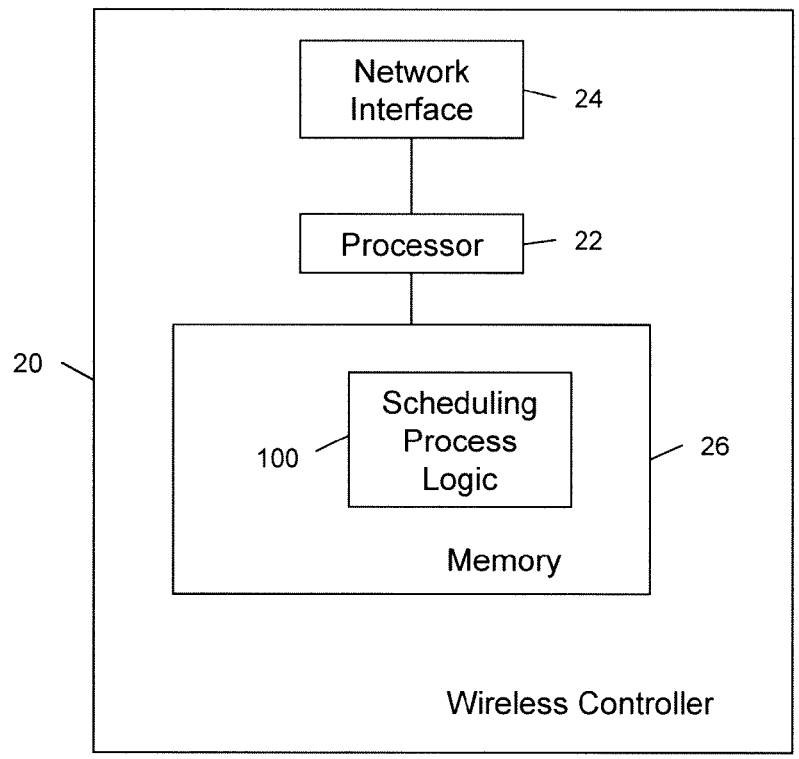
FIG. 3 is an example of a block diagram of a wireless controller apparatus configured to generate scheduling configuration parameters according to various techniques described herein.

Referring now to FIG. 3, an example of a block diagram of a wireless controller apparatus 20 is now described. The wireless controller apparatus 20 is a computing apparatus with network connectivity and to this end it comprises a processor 22, a network interface unit 24 and a memory 26. The processor 22 is, for example, a microprocessor or microcontroller, that is programmable such that its functions are determined by instructions, stored in the memory 26, that the processor 22 executes. In other forms, the processor 22 may be an ASIC, or other fixed or programmable data processing device. The network interface device 24 is, for example, an Ethernet card or module similar to the network interface device 14 shown in FIG. 2. The memory stores instructions for scheduling process logic 100 that, when executed by the processor 22, causes the processor to perform the operations described herein for the scheduling process logic 100. As explained herein, some or all of the functions of the scheduling process logic 100 may reside in an AP (FIG. 2). The wireless controller apparatus 20 may be a WLAN controller.

Figure 4:
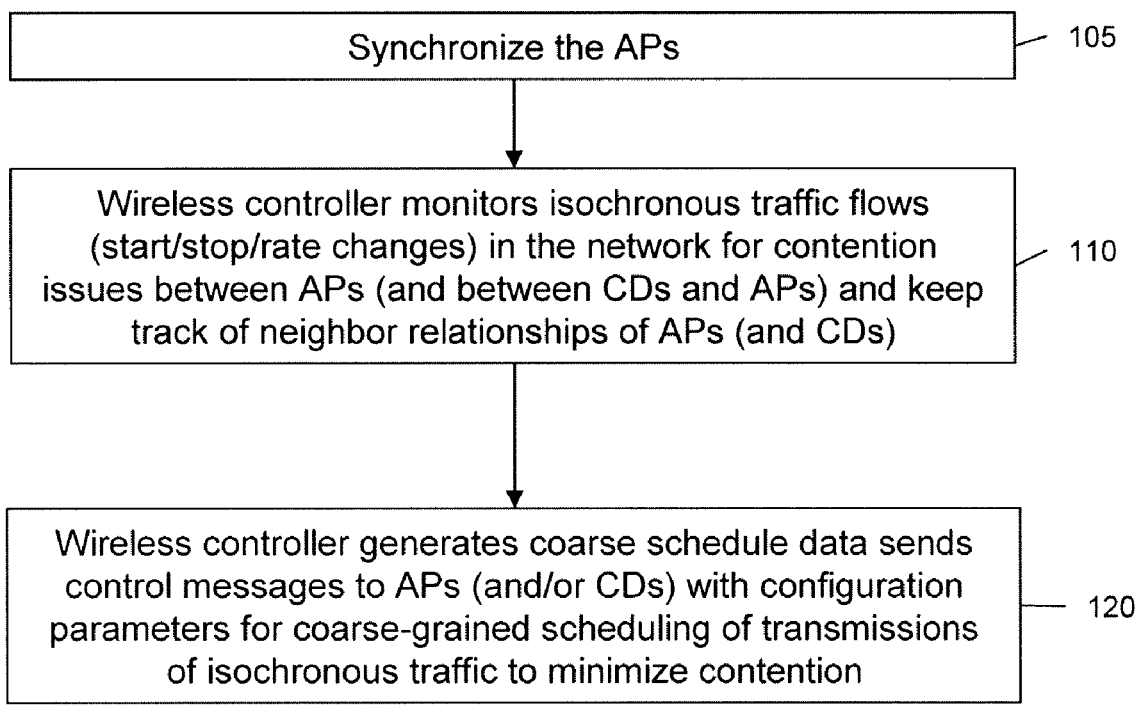
FIG. 4 is an example of a flow chart generally depicting scheduling process logic in the wireless controller apparatus used to generate the scheduling configuration parameters.

Turning to FIG. 4, the scheduling process logic 100 is now generally described. The scheduling process logic 100 is configured to provide "coarse-grained" scheduling of transmissions of isochronous traffic to minimize collisions between such transmissions, whether those transmissions originate at an AP to be sent in a downlink transmission to one or more CDs or they originate at a CD to be sent in an uplink transmission to one or more APs. At 105, the APs are time-synchronized to facilitate the scheduling schemes described herein. Any of a variety of synchronization schemes may be employed to synchronize the APs. At 110, the wireless controller apparatus 20 monitors isochronous traffic flows in the wireless network for contention issues between APs and also between CDs and APs, depending on the source/destination of the isochronous traffic to be sent in the wireless network (i.e., at an AP or at a CD). In order to monitor isochronous traffic flows, the wireless controller apparatus 20 receives from APs messages that report existence of isochronous traffic flows to be transmitted by individual APs and also the existence of isochronous traffic flows queued for uplink transmission from CDs to their respective APs. (The mechanism by which CDs communicate with the wireless controller apparatus 20 is described hereinafter.) The APs are configured, as part of a network deployment, to notify the wireless controller apparatus 20 as to queuing up of isochronous traffic flows, e.g., video or audio, and particular relatively long-lived isochronous traffic flows. One mechanism is to forward an 802.11 Add Traffic Stream (ADDTS), DMS, or MRG request to the wireless controller apparatus 20 with the packet format and QoS requirements described by The Traffic Classification (TCLAS), TCLAS processing and Traffic Specification Information Elements (TSPEC IEs).

In addition, at 110, the wireless controller apparatus 20 keeps track of "neighborness" among the plurality of APs. That is, the wireless controller apparatus 20 determines, through messages indicating receive signal strength of nearby APs (and optionally their clients as well), which APs (and clients) are in sufficient RF proximity so as to quality of a neighbor. Moreover, the wireless controller apparatus 20 knows the RF channels on which each AP operates. Consequently, the controller apparatus 20 knows which APs are in sufficient RF proximity such that they can interfere with each other. For example, as shown in FIG. 1, the dashed line between AP 10(1) and AP 10(2) indicates that these two APs are neighbors and that their transmissions, if they overlap in time, will collide with each other. The same is true as between AP 10(2) and AP 10(4), between AP 10(2) and AP 10(3), between AP 10(4) and AP 10(5), between AP 10(5) and AP 10(6) and between AP 10(3) and AP 10(6). AP2 and AP5 are not neighbors and could transmit simultaneously. It should be understood that the connectivity or RF proximity between APs may be extended to consider Basic Service Set (BSS) connectivity, thus accounting for RF proximity as between CDs and APs in different BSSs. This can make for more complex processing in order to account for Beacon reports for each CD as opposed to neighbor messages for each AP. In many cases, AP connectivity is a sufficient and more convenient characterization.

At 120, based on the messages received from the APs concerning the isochronous traffic flows to be transmitted and the RF proximity of APs, the wireless controller apparatus 20 generates configuration parameters comprising schedule data indicating the start times for wireless transmission bursts within each isochronous traffic flow from respective ones of the APs and/or respective ones of the CDs in order to reduce collisions (reduce the likelihood of interference) between the wireless transmissions carrying isochronous traffic. The schedule data contained in the configuration parameters is designed to provide coarse-grain scheduling of transmissions. There are several techniques described herein for scheduling the start times of the isochronous traffic flows. The functions 110 and 120 are functions of the scheduling process logic 100. Using the configuration parameters received from the wireless controller apparatus, each AP and/or CD then performs packet scheduling for its transmissions using the scheduling data contained in the configuration parameters. This is one of the functions of the control process logic 50 in each AP and similar process logic in a CD.

Some basic WiFi (IEEE 802.11) terminology is explained at the outset as it will be referred to hereinafter in the following description. Sharing access to a channel among multiple devices in a WiFi WLAN is based on a medium access control (MAC) layer that uses a Distributed Coordination Function (DCF) to share the medium between multiple CDs. DCF relies on carrier sense multiple access/collision avoidance (CSMA/CA) and optionally a request-to-send and clear-to-send (RTS/CTS) technique to share the medium between CDs. In addition, the 802.11 MAC layer defines another coordination function called the Point Coordination Function (PCF), which is available only in "infrastructure" mode, where CDs are connected to the network through an AP. APs send "Beacon" frames at regular intervals (usually every 0.1 second). Between these Beacon frames, PCF defines two periods: the Contention Free Period (CFP) and the Contention Period (CP). During the CP, the DCF is used. During the CFP, the AP sends Contention Free-Poll (CF-Poll) packets to each CD, one at a time, to give them the right to send a packet. The AP is the coordinator.

The IEEE 802.11e rules enhance the DCF and the PCF, through a coordination function called the Hybrid Coordination Function (HCF). Within the HCF, there are two methods of channel access, similar to those defined in the legacy 802.11 MAC: HCF Controlled Channel Access (HCCA) and Enhanced Distributed Channel Access (EDCA). Both EDCA and HCCA define Traffic Categories or Traffic Classes (TC), for different types of traffic, such as email traffic, video or voice (isochronous traffic), etc.

With EDCA, high priority traffic has a greater chance of being transmitted than lower priority traffic. A CD with high priority traffic waits a shorter period of time (than a CD with lower priority traffic) before sending its packet. In addition, each priority level is assigned a Transmit Opportunity (TXOP). A TXOP is a bounded time interval during which a device can send as many frames as possible (as long as the duration of the transmissions does not extend beyond the maximum duration of the TXOP). If a frame is too large to be transmitted in a single TXOP, it is fragmented into smaller frames.

The HCCA scheme works similarly to the PCF. However, unlike the PCF, in which the interval between two Beacon frames is divided into two periods of CFP and CP, the HCCA allows for CFPs to be initiated at almost anytime during a CP. This kind of CFP is called a Controlled Access Phase (CAP) in 802.11e parlance. A CAP is initiated by the AP, whenever it wants to send a frame to a CD, or to receive a frame from a CD, in a contention free manner. During a CAP, the Hybrid Coordinator (HC), i.e., the AP, controls the access to the medium. During the CP, all CDs operate according to the EDCA scheme. The other difference between HCCA and the PCF is that TC and Traffic Streams (TS) are defined. The HCCA scheme is generally considered a more advanced coordination function and QoS can be configured with greater precision; but the case of overlapping APs is only weakly addressed by the HCCA provisions in 802.11e.

Figures 5, 6:
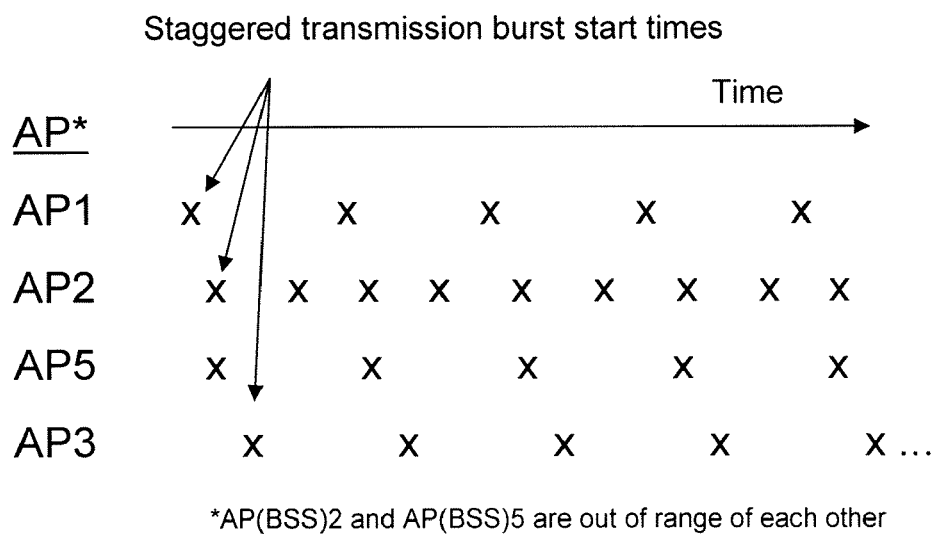
FIG. 5 is an example of a timing diagram depicting the staggering of the start times of isochronous flows from multiple wireless network access point devices and/or client devices.
FIG. 6 is an example of a ladder flow diagram depicting the interaction between the wireless controller apparatus and wireless network access point devices to perform the staggered start time process depicted in FIG. 5.

Turning now to FIGS. 5 and 6, one example of a technique for configuring the start times of wireless transmission of isochronous traffic flows is described. In this example, the neighborness of APs is the same as that described above in connection with the dashed lines in FIG. 1. Furthermore, in this example, it is assumed that APs 10(1), 10(2), 10(3) and 10(5) have isochronous traffic flows to transmit, and AP 10(2) has isochronous traffic flows requiring bursts twice as often as APs 10(1), 10(3) and 10(5). In this example, the wireless controller apparatus 20 may generate scheduling data to schedule the start times of the isochronous traffic flows in order to stagger the burst start times from APs 10(1), 10(2), 10(3), 10(5) and 10(6) according to the schedule shown in FIG. 5. In this example, since APs 10(2) and 10(5) are not neighbors of each other as indicated in FIG. 1, they can send their bursts at the same time. However, APs 10(1) and 10(2) are neighbors and therefore their bursts start times are offset, and the same is true as between APs 10(2) and 10(3) and consequently their burst start times are offset from each other so that with high probability an earlier burst completes before the next staggered burst begins. Again, the objective is to achieve non-overlapping bursts associated with different isochronous flows and the mechanism to achieve this is by staggering their burst start times.

FIG. 6 illustrates a ladder diagram depicting a mechanism by which the wireless controller apparatus 20 configures the APs to transmit with the staggered burst start times. At 122, wireless controller (WC) 20 sends control messages to APs with configuration parameters (scheduling data) for the staggered burst start times. The APs then make their transmission bursts according to the staggered start times contained in the configuration parameters. The configuration parameters are coarse-grain as explained above to allow for latency between controller and APs, imperfect synchronization, and contention for the medium; and it is up the APs to perform packet-level scheduling for the bursts.

Thus, to summarize the techniques depicted by FIG. 6, the schedule data (generated by the WC 20) comprises staggered start times for wireless transmission bursts within each isochronous traffic flow from one or more wireless access point devices and/or one or more wireless client devices to avoid (minimize or reduce with high probability) overlap of the wireless transmission bursts from different isochronous flows.

Figure 7:
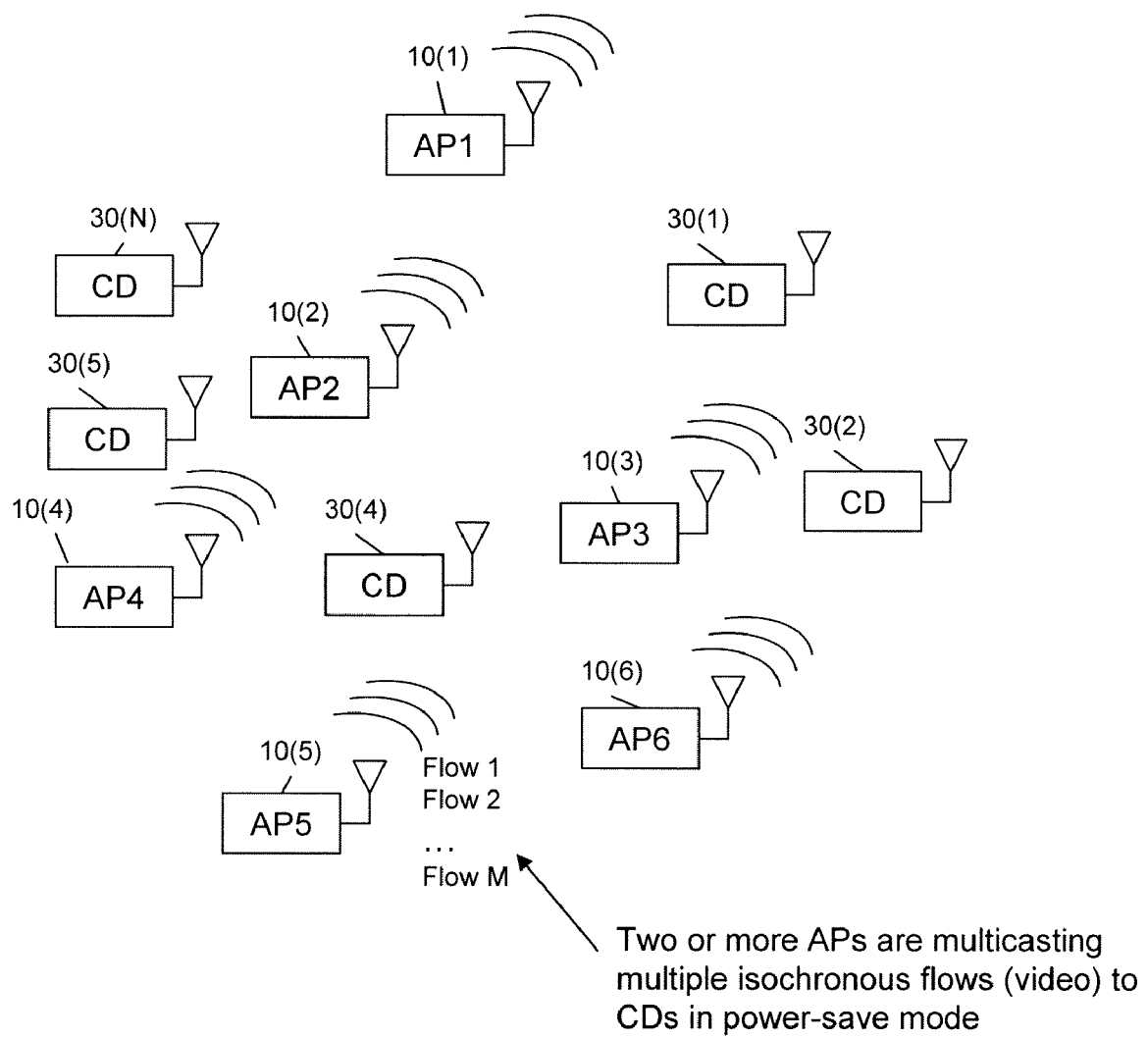
FIG. 7 is an example of a block diagram of a wireless network configuration in which contention reduction techniques are performed with respect to multiple wireless network access point devices multicasting multiple isochronous flows to client devices operating in a power-save mode.

Reference is now made to FIG. 7 for a description of another example of a technique for scheduling transmission bursts of isochronous traffic. In this example, there are multiple APs, e.g., APs 10(1)-10(6) that are configured to multicast isochronous traffic to CDs that are configured to operate in a power-save mode in which they turn off their receivers to save power. For example, the APs are deployed in a location, such as a stadium or other large indoor or outdoor facility, where the APs are in line-of-sight of each other, and are multicasting multiple isochronous traffic flows, e.g., video from video cameras at different camera angles within a stadium, and the CDs are so-called "smartphone" devices, such as an IEEE 802.11g-only iPhone™ device. In FIG. 7, this is shown where APs 10(1), 10(2), 10(3) and 10(5) are each multicasting multiple isochronous traffic flows, identified as Flows 1-M.

Figure 8:
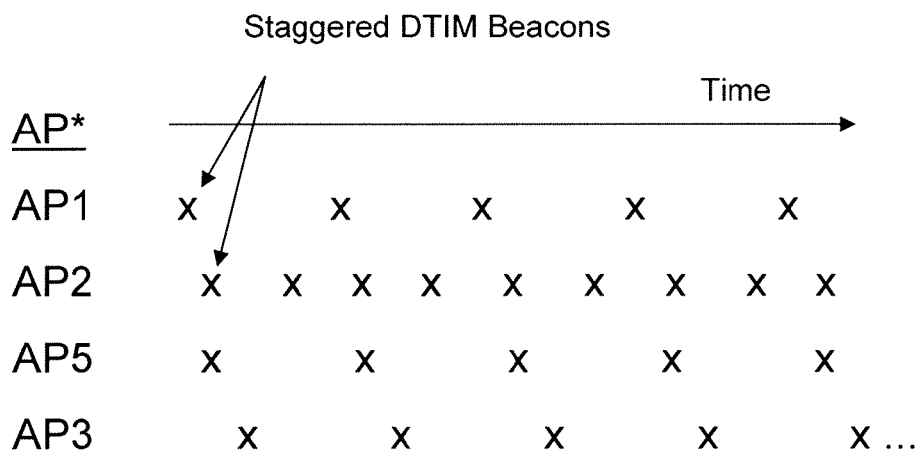
FIG. 8 is an example of a timing diagram depicting the staggering of Delivery Traffic Indication Message Beacon frames useful in the wireless network configuration shown in FIG. 7.
Figure 9:
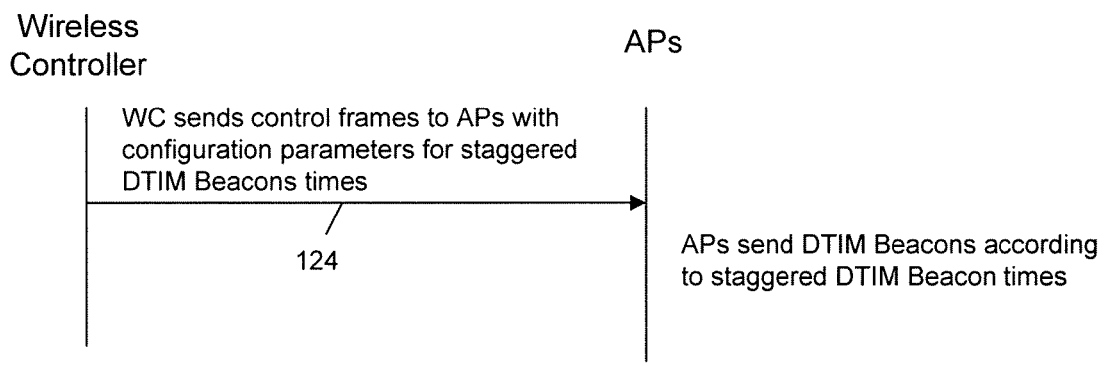
FIG. 9 is an example of a ladder flow diagram depicting the interaction between the wireless controller apparatus and wireless network access point devices to perform the staggered Beacon frame transmission process depicted in FIG. 8.

A collision minimization solution for the scenario depicted in FIG. 7 is shown in FIGS. 8 and 9. In this example, the APs 10(1), 10(2), 10(3) and 10(5) are configured to stagger the start time of their bursts by staggering a Beacon frame that the APs use to alert their associated CDs of an impending transmission of traffic. For example, the Beacon frame is a Delivery Traffic Indication Message (DTIM) Beacon frame in accordance with the IEEE 802.11 standard. A Beacon frame contains a traffic indication map. The DTIM Beacon frame is a special Beacon frame that notifies power-save CDs that a packet is waiting to be transmitted to them. Power-save CDs always wake for the DTIM beacons. If power-save CDs are active, the AP buffers any multicast traffic and delivers them immediately after the DTIM beacon.

The APs 10(1), 10(2), 10(3) and 10(5) are configured to stagger the transmissions of their DTIM Beacon frames, an example of which is shown in FIG. 8. By staggering the DTIM Beacons of the respective APs, the start times of the isochronous traffic transmissions from the respective APs are thereby staggered.

FIG. 9 illustrates a ladder diagram whereby at 124, the WC 20 sends a control frame to the APs with configuration parameters (schedule data) for staggered DTIM Beacon transmission times, which, as explained above, will cause a staggering of the transmission start times of the isochronous flows from the APs.

To summarize the techniques depicted by FIG. 8, the schedule data (generated by the WC 20, for example) comprises start times for beacon frames broadcasted by wireless access point devices to wireless client devices that are configured with a power-save mode, which beacon frames indicate that a packet that is part of a multicast isochronous traffic flow is waiting to be transmitted, and wherein the start times for the beacon frames from multiple wireless access point devices are staggered to avoid overlap of bursts of wireless transmission for multicast isochronous traffic from multiple wireless access point devices to wireless client devices.

Figure 10:
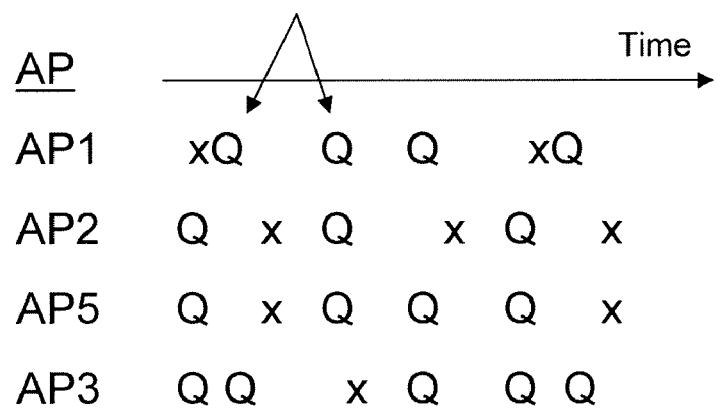
FIG. 10 is a timing diagram depicting the use of Quiet elements to suppress the transmissions from client devices.
Figure 11:
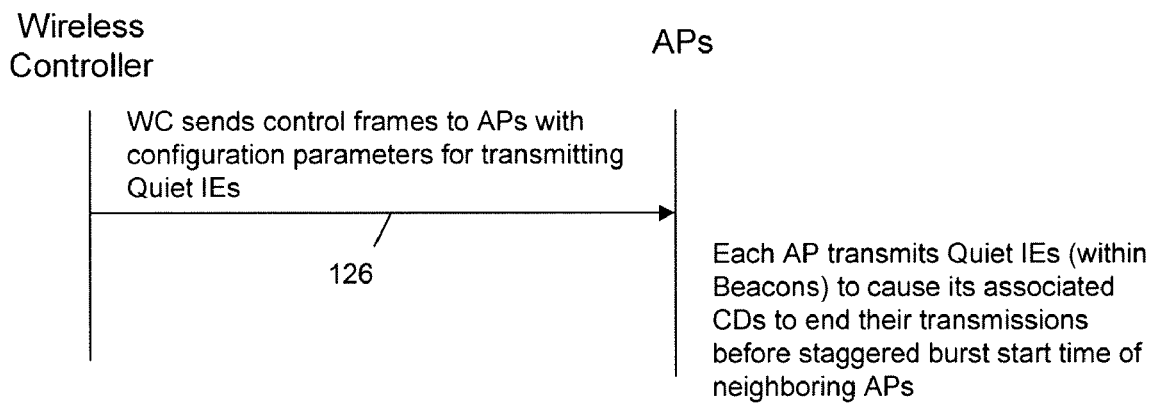
FIG. 11 is an example of a ladder flow diagram depicting the interaction between the wireless controller apparatus and wireless network access point devices to use Quiet elements as depicted in FIG. 10.

Another contention reduction technique is now described with respect to FIGS. 10 and 11. Neighboring APs may be configured to use the so-called Quiet element prescribed in the IEEE 802.11 standard in order cause associated CDs to end their transmissions (i.e., quiet the channel) before start times of bursts of isochronous traffic so that each neighboring AP can transmit its burst with reduced or minimize the likelihood of contention at the burst start time. The burst start times of the isochronous traffic flows may be staggered using the techniques described herein, e.g., FIGS. 5-9.

In FIG. 10, quiet time identified by the letter "Q" whereas the burst start time is denoted by the letter "x". AP1 broadcasts a Quiet IE (e.g. within Beacons, well in advance of the actual quiet time Q as shown in FIG. 5) prior to AP2's scheduled burst start time so that the CDs associated with AP1 will end their transmissions prior to AP2's scheduled burst start time. AP2 broadcasts a Quiet element prior to AP1's scheduled burst start time so that the CDs associated with AP2 end their transmissions prior to AP2's scheduled burst start time. AP5 broadcasts a Quiet element prior to AP3's scheduled burst start time so that CDs associated with AP5 end their transmissions prior to AP3's scheduled burst start time. Also, AP3 broadcasts a Quiet element prior to AP5's scheduled burst start time and broadcasts a Quiet element prior to AP2's scheduled burst start time, so that CDs associated with AP3 end their transmissions before AP2's scheduled burst start time and before AP5's scheduled burst start time. Using knowledge of the scheduled burst start times of each of the APs, either the wireless controller apparatus 20 or the APs determine when to transmit the Quiet elements.

FIG. 11 illustrates a ladder diagram depicting a mechanism by which the APs are configured to transmit Quiet IEs indicating the proper quiet times. At 126, the WC 20 sends to the APs control messages with configuration parameters that cause the APs to transmit Quiet IEs indicating an appropriate schedule so that the CDs of the respective APs are quieted (end their transmissions) before the neighboring AP's scheduled burst start time.

To summarize the techniques depicted by FIG. 10, the schedule data (generated by the WC 20, for example) comprises data for quiet elements to be transmitted by one or more of the wireless access point devices to their associated wireless client devices to cause their associated wireless client devices to end their transmissions before the start times for wireless transmission bursts from the respective wireless access point devices.

Set forth above are examples of structures for a Control Frame and a Control Field contained in a Control Frame that may be generated by the WC 20 and sent to the APs to coordinate the operations described above in connection with FIGS. 4, 6, 9 and 11. The packet header field may be in accordance with the Control and Provisioning of Wireless Access Points (CAPWAP) protocol for example.

The Traffic Classification (TCLAS) and TCLAS processing IEs identify the packets associated with the flow that is subject to the coordination and are standard IEEE 802.11 elements. In the Control Field, when the "Apply to Beacon" subfield is set to 1, TCLAS and TCLAS processing Information Elements (IEs) are omitted per the process described above in connection with FIG. 9. for DTIM Beacon-based coordination. The Timing Synchronization Function (TSF) start time and Service Interval fields, in combination, identify the (staggered) start times for the flow. Service Duration specifies an upper bound on each burst (0xffff signifies no upper bound, for example). The "Protect with Quiet element" subfield in the Control Field is used to enable the Quiet element for the operations described above in connection with FIG. 11.

Example of Control Frame for FIGS. 4, 6, 9 and 11

Example of Control Field

| Protect with Quiet element | Apply to beacon | Reserved |
|---|---|---|
| B0 | B1 | B2-B15 |

With reference to FIG. 12, still another technique is described to reduce contention. These techniques are designed to cope more efficiently with the variable bit rate (VBR) nature of isochronous streams. Specifically, the transmission of isochronous streams is constrained to align on a burst interval that is a multiple of a superframe interval (e.g. 5 ms, 10 ms). As shown in FIG. 12, a time window is divided into superframes shown at 130(1), 130(2), . . . , and each superframe is divided into subframes 132(1)-132(4) in an example where there are four subframes within a superframe.

Within a subframe, one AP (or isochronous flow) has a highest priority (P=0), another AP has a next-highest priority (P=1), and so on. The highest priority AP is called the "subframe owner". The WC 20 assigns priority to the APs (isochronous flows), such as in a rotating fashion. For example, as indicated in FIG. 12, during subframe 1 of superframe 1, AP 10(1) is configured to have highest priority, APs 10(3) and 10(5) have next highest priority, and APs 10(2) and 10(6) have still the next highest priority. During subframe 2 of superframe 1, APs 10(2) and 10(6) have highest priority, AP(1) has next highest priority and APs 10(3) and 10(5) have next highest priority, and so on.

The WC 20 configures the duration of subframes to be a predetermined percentage, such as 80%, of an isochronous flow's maximum burst duration. As a result, a VBR burst of an isochronous burst finishes earlier than the end of the subframe so that there is time in the subframe for traffic from other APs, and in some cases, the isochronous burst cannot be completed within the subframe.

Reference is now made to FIG. 13. At the start of a subframe, the APs other than the subframe owner AP that are near the subframe owner AP may use the Quiet element to interrupt their CDs transmissions to help the subframe owner AP obtain a TXOP for its isochronous flow, up to the duration of the subframe. In the example of FIG. 13, AP 10(1) is the subframe owner AP. The duration of the TXOP is sufficiently long for the subframe owner AP to complete its burst and to allow additional time (called "overhang" and designated "<OH>" in FIG. 13) for TXOP chaining to other APs identified by the WC 20 so that these other APs can obtain priority access to the medium if needed. When an AP completes its burst within the subframe, and within the TXOP, the subframe owner AP yields the channel to other APs by transmitting a special frame to the other APs in its contention vicinity or proximity. For example, AP 10(2) receives the special frame and obtains the TXOP following (i.e., chained from) the TXOP of AP 10(1). In FIG. 13, "XX" is aligned with "<0" and is meant to denote that AP3 and AP5 do not contend for the

| Packet header | Frame type (and optionally subtype) identifiers | Control field | (Lower 4 octets of) TSF start time (us) | Service interval units: 0 (1/32 ms), 1 (16.6666 . . . / 256 ms) | Service interval | Service duration (units of 1/32 ms) | 0 or more TCLAS IE | 0 or more TCLAS processing IE |
|---|---|---|---|---|---|---|---|---|
|  | 1 or 2 octets | 2 octets | 4 or 8 octets | 1 octet | 2 octets | 2 octets |  |  | medium at the beginning of the overhand interval, and "CC" is aligned with "H>" and is meant to denote that AP2 does contend for the medium at the end of the overhang interval. Finally, the "<" "<TXOP2>" is aligned with a "C" in "CC" to indicate that AP2 successfully contended then and obtained a TXOP, called TXOP2.

When the other (non-subframe owner) APs had a burst to transmit that was too large for their own subframes, the AP with priority P in the current subframe waits P backoff time slots then requests a TXOP for its isochronous flow, but still within the TXOP of the subframe owner. For example, if the AP with next highest priority, P=1, has isochronous traffic to send, it obtains the TXOP ahead of all other APs which have to wait P=2, 3, 4, . . . , backoff time slots which are much shorter than a subframe duration, e.g., 9 μsec.

The chained TXOP needs to complete before the end of the subframe. If the subframe owner AP and all other APs with isochronous traffic to send complete their transmissions before the end of the subframe, then the TXOP (and chained TXOPs) elapse, and the channel is available for conventional CSMA/CA for APs to transmit non-isochronous traffic. When the subframe owner AP has too much isochronous traffic for its assigned subframe, it waits for subsequent subframes, for the subframe owner to complete, and then it contends for the remainder of the subframe as described above (based on its relatively priority for that subframe). The WC 20 does not assign subframe owner APs to all subframes; there may be some subframes for which no owner AP is assigned, in which case, conventional CSMA/CA contention techniques are used.

In configuring the APs to perform the contention techniques described in connection with FIGS. 12 and 13, the WC 20 keeps track of long-lived isochronous flows and AP neighbor/RF proximity relationships, designs the superframe and subframes, and the reuse of subframes across distant APs, assigns the priorities of APs within each subframe, and sends the TXOP overhang duration. The WC 20 does not do packet scheduling. It does coarse-grained prioritization triggered by events (start and stop of isochronous flow and significant changes in PHY rate used for an isochronous flow).

Set forth below are examples of a Control Frame, a Subframe IE field and a Priority/AP MAC field, that are useful for the techniques described in connection with FIGS. 12 and 13.

Example of Control Frame for FIG. 13

| Packet header | Frame type (and optionally subtype) identifiers | Superframe interval units: 0 (1/32 ms), 1 (16.6666 . . . / 256 ms) | Superframe interval | 1 or more Subframe IE |
|---|---|---|---|---|
| 1 or 2 octets | 1 octet | 2 octets | variable | |

Example of Subframe IE

Example of Priority/AP MAC Field

| Priority | AP MAC address |
|---|---|
| 1 octet | 6 octets |

The Control Field for the Control Frame for the techniques of FIGS. 12 and 13 may be the same as the Control Field described above in connection with FIGS. 4, 6, 9 and 11.

Figure 14:
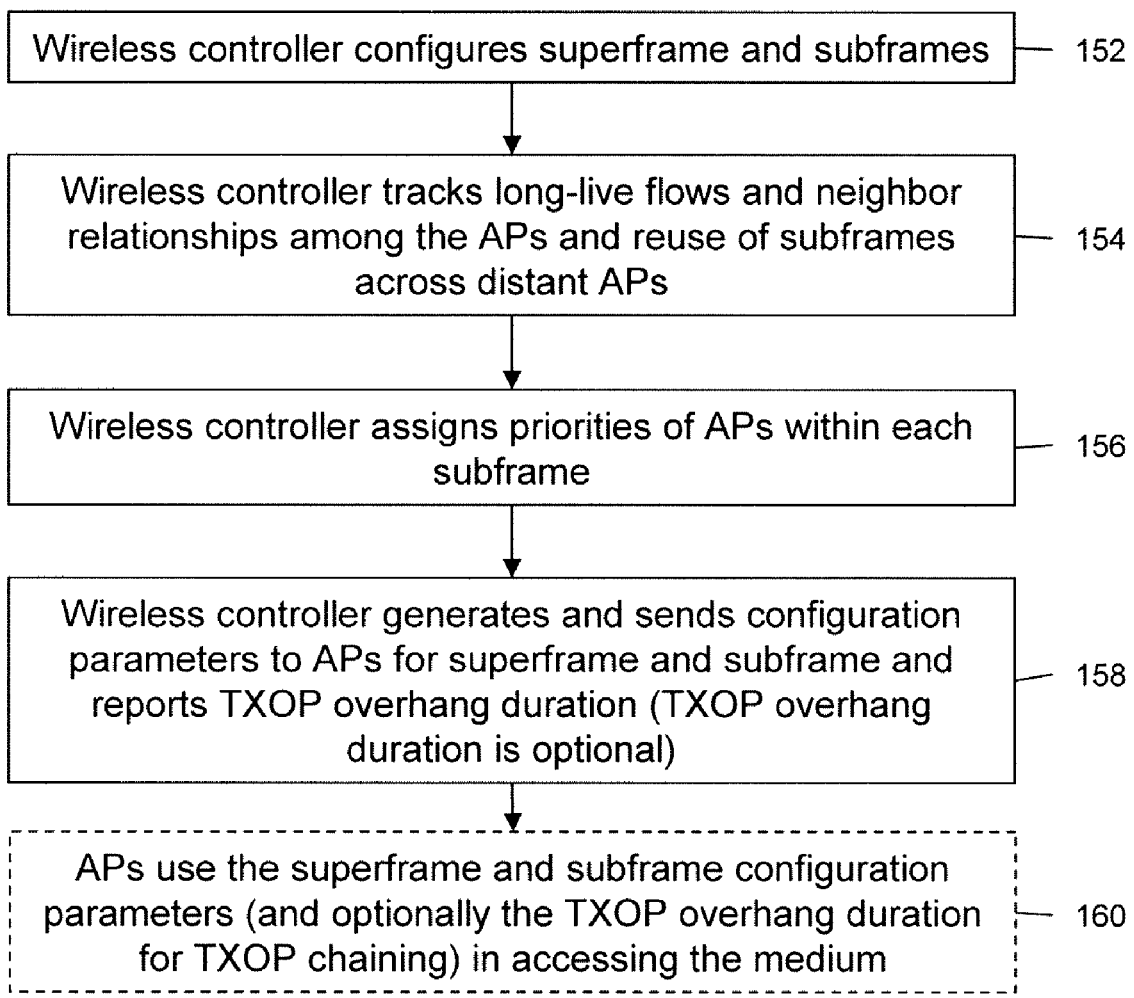
FIG. 14 is an example of a flow chart for operations performed by the wireless controller apparatus to configure wireless network access point devices to perform the techniques depicted by FIGS. 12 and 13.

Reference is now made to FIG. 14 for a description of a flow chart that depicts operations 150 of the WC 20 in configuring APs to perform the process described above in connection with FIGS. 12 and 13. At 152, the WC 20 configures the parameters (duration, etc.) for the superframe and subframes. At 154, the WC 20 keeps track of long-lived isochronous flows and neighbor relationships among APs, as well as the reuse of subframes among APs that are distant from each other, i.e., not neighbors.

At 156, the WC 20 assigns priorities of APs within each subframe. As explained above in connection with FIGS. 12 and 13, the priorities may be assigned on a rotating basis. At 158, the WC 20 generates and sends configuration parameters, via a Control Frame such as the one presented above, to the APs to notify the APs of the subframe and superframe parameters and optional also the TXOP overhang duration. The coordination of AP contention of the medium may be based on the superframe and subframe parameters without TXOP chaining, such that the TXOP overhang duration information is optional. Based on the configuration parameters sent at 158, the APs are sufficiently informed about the superframe and subframe, and optionally about TXOP overhang duration, so as to perform the coordinated process described above. Thus, at 160, the APs use the configuration parameters to contend for use of the channel and optionally to chain TXOPs across multiple isochronous traffic flows (across the APs). The operations 160 are performed by AP control process logic 50 (FIG. 2) and examples of which are described hereinafter with reference to the flowcharts of FIGS. 15 and 16. The operations shown at 160 are in a dashed block to indicate that these operations are performed by the APs and not by the WC 20.

To summarize the techniques depicted by FIGS. 12-14, the schedule data (generated by the WC 20) comprises data defining a superframe interval comprising a plurality of subframe intervals such that the wireless transmission of isochronous traffic is constrained to align on a burst interval that is a multiple of the superframe interval, wherein each subframe interval has a duration that is a percentage of a maximum wireless transmission burst duration. The schedule data also comprises data assigning a relative priority for each of the plurality of wireless access point devices or wireless client devices to a subframe such that preference for a subframe is given to the isochronous traffic flow from a wireless access point device or wireless client device with a highest priority for that subframe. Furthermore, the schedule data may further

| Subframe Identifier | Length | Control field | Service interval offset (units of 1/32 ms) | Service duration (units of 1/32 ms) | Overhang duration (number of backoff time slots) | N = 1 or more Priority/AP MAC field |
|---|---|---|---|---|---|---|
| 1 octet | 1 octet | 2 octets | 2 octets | 2 octets | 1 octet | N*(7 octets) | comprise configuration data to cause a highest priority wireless access point device to request a transmit opportunity interval for a wireless transmission burst to complete prior to the end of the subframe to allow for an overhang interval for use for transmission of a wireless transmission burst for a next highest priority wireless access point or wireless client device on a collision-free basis and to cause other wireless access point devices or wireless client devices to, in response to reception of a message received from the wireless access point device or wireless client device associated with the highest priority isochronous traffic flow, to wait a number of backoff time slots within the subframe prior to requesting a transmit opportunity interval in the subframe.

Figure 15:
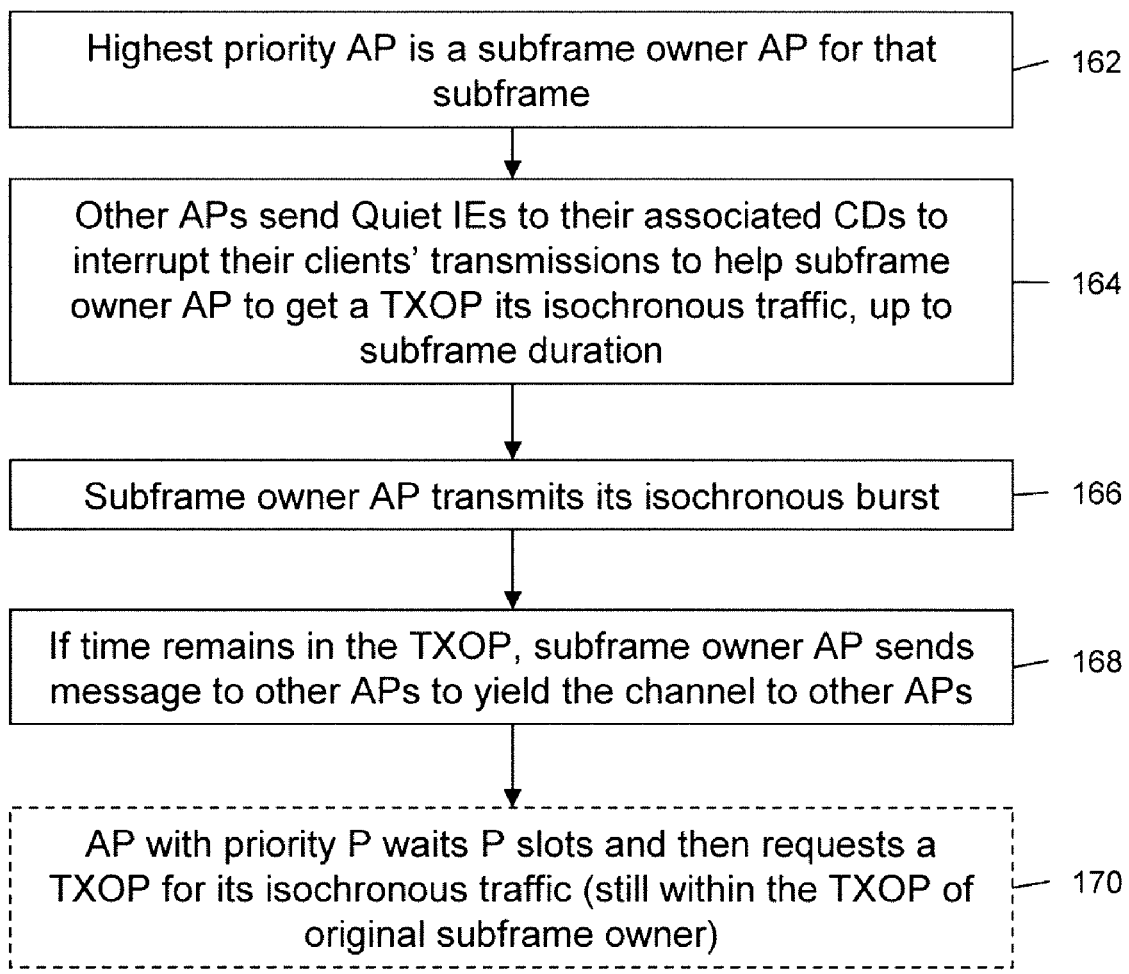
FIG. 15 is an example of a flow chart depicting operations performed by wireless network access point devices in connection with the techniques depicted by FIGS. 12 and 13 when the wireless network uses Enhanced Distributed Channel Access (EDCA) techniques.

FIG. 15 illustrates a flow chart that depicts operations of the APs in performing the coordinated contention process in response to receiving a Control Frame for the superframe and subframe and TXOP overhang duration parameters. At 162, the highest priority AP for a subframe becomes a subframe owner AP for that subframe. At 164, the other (lower priority APs) send Quiet IEs to their associated CDs to interrupt their CDs' transmissions to help the subframe owner AP gain a TXOP for its isochronous traffic, up to a subframe duration. At 166, the subframe owner AP transmits its isochronous burst. At 168, if time remains within the TXOP, the subframe owner AP sends a message to other APs to yield the channel to other APs. At 170, the AP with priority P waits P backoff time slots and if free then requests a TXOP for its isochronous traffic (still within the TXOP of the original subframe owner). Function 170 is shown in dotted lines to indicate that the TXOP overhang or chaining is not required to be performed; the process may stop at 168 in the case that TXOP chaining operations are not employed and the superframe and subframe parameters alone are used to govern how APs contend for the medium.

The techniques described herein in connection with FIGS. 12-15 involve two operations: (1) Assignment of priority to APs within subframes; and (2) Chaining of TXOPs. These operations may be performed independently of each other. That is, AP priority within subframes may be performed without TXOP chaining, and vice versa. The assignment of priority to APs for subframes may take one of several forms, such as: (a) with TXOP chaining; (b) waiting for APs with higher priorities to start and finish their TXOPs before contending (so that higher priority APs send a null frame when they have no isochronous burst to transmit in order to allow lower priority APs to determine that it is their turn to obtain a TXOP during that subframe; (c) AP raises and lowers its EDCA parameters according to their relative priority within a subframe so that it backs off with a shorter or longer period of time, for example. Thus, an AP may configure itself, or be configured, as to how aggressively it competes for the channel.

Still another variation to the chaining of TXOPs as described above is for the APs to pass a token from one AP to another AP. The AP with the token has priority of channel access for a TXOP. The token may be passed by an over-the-air frame sent from one AP to another AP (or to multiple APs of they or their BSSs do not overlap), or by a configuration message or frame sent by the WC 20.

Figure 16:
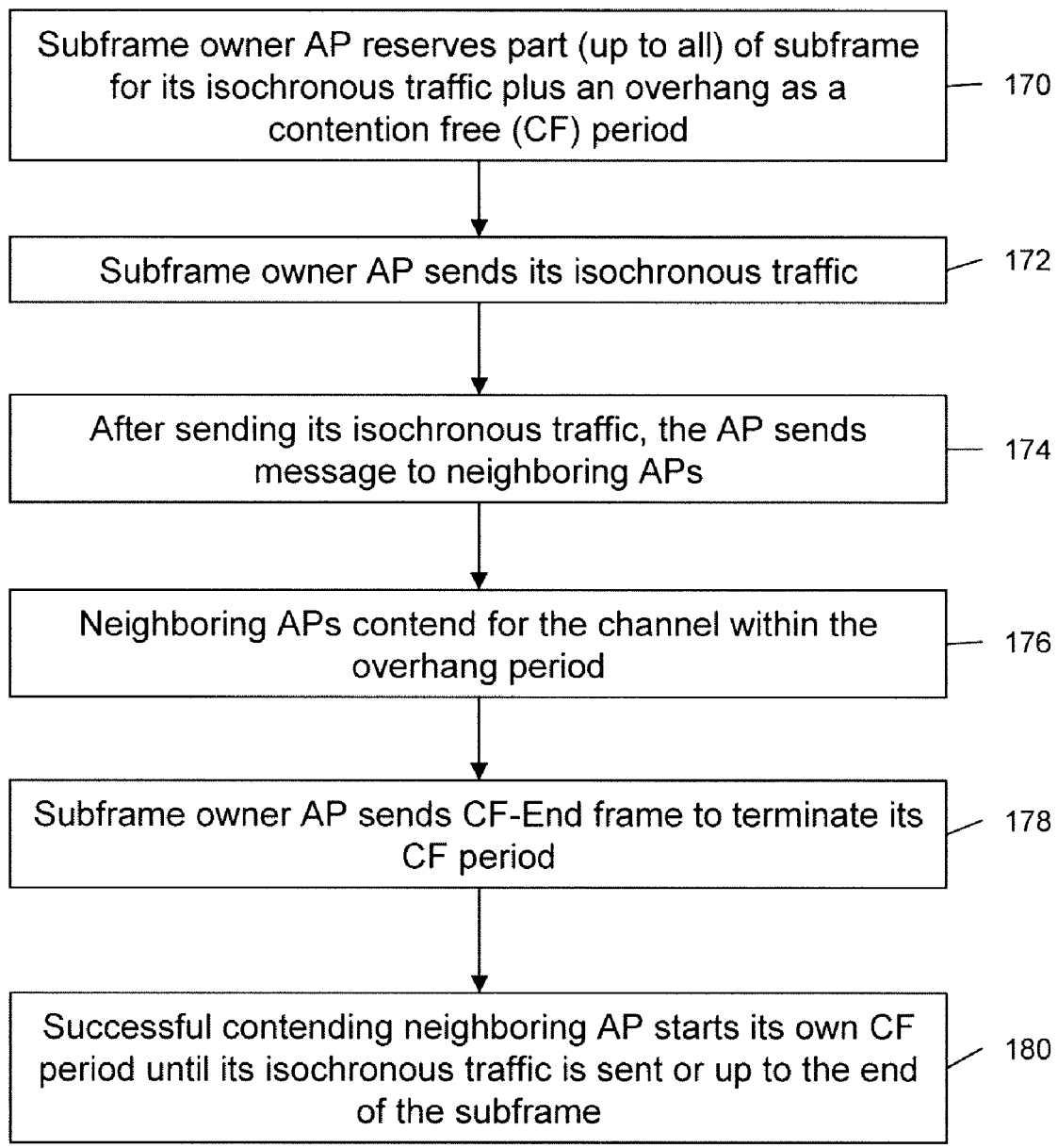
FIG. 16 is an example of a flow chart depicting operations performed by wireless network access point devices in connection with the techniques depicted by FIGS. 12 and 13 when the wireless network uses Hybrid Coordinated Function Channel Access (HCCA) techniques.

The techniques described above in connection with FIGS. 12-15 are applicable to EDCA techniques and HCCA techniques. FIG. 16 illustrates a flow chart, similar to that of FIG. 15, but for adapted for an HCCA scheme. At 170, the subframe owner AP reserves part (and up to all) of a subframe for its isochronous traffic plus an overhang as a CFP. At 172, the AP sends its isochronous traffic burst. At 174, after sending its isochronous burst, the subframe owner AP sends a message to its neighboring APs (via a special frame) to alert them of its completion of its burst. At 176, the neighboring APs contend for the channel within the overhang period as described above in connection with FIGS. 12-14. At 178, the subframe owner AP sends a CF-End frame to terminate its CFP. At 180, at the Short Interframe Space (SIFS), the small time interval between the data frame and its acknowledgment, the successful contending neighboring AP starts its own CF period until its isochronous traffic is sent or up to the end of the subframe, whichever occurs first. When all neighboring APs with isochronous traffic have completed transmitting their traffic, then the CFP ends so that CSMA can resume for "bursty" traffic.

Set forth below is an example of a Control Frame used by an AP when it yields the medium to other APs. This Control Frame is useful in the techniques described above in connection with operation 168 in FIG. 15 and operation 174 in FIG. 16. The Control Frame may be standardized or Vendor-Specific and the example below shows a Vendor-Specific frame.

Example of Control Frame to Yield Channel to Other APs

| 802.11 MAC header (action frame) | Category | OUI | Frame type (and optionally subtype) identifiers (indicating Yield) | Optional field providing additional information (Lower 4 octets of) Superframe TSF start time (us) | Optional field providing additional information (Lower 4 octets of) Subframe TSF start time (us) |
|---|---|---|---|---|---|
|  | 1 octet | 3 octets | 1 or 2 octets | 4 or 8 octets | 4 or 8 octets |

...

| Optional field providing additional information Subframe ID | Optional field providing additional information Priority (of AP transmitting the frame) | Optional field providing additional information Overhand duration (number of slots) | Optional field providing additional information; N = 1 or more Priority/AP MAC field (of APs with lower priority) |
|---|---|---|---|
| 1 octet | 1 octet | 1 octet | N*(7 octets) |

In the above example Control Frame, OUI refers to an Organizationally Unique Identifier, which is a 24-bit number that is obtained from the IEEE Registration Authority. This identifier uniquely identifies a vendor, manufacturer, or other organization (referred to by the IEEE as the "assignee").

Figure 17:
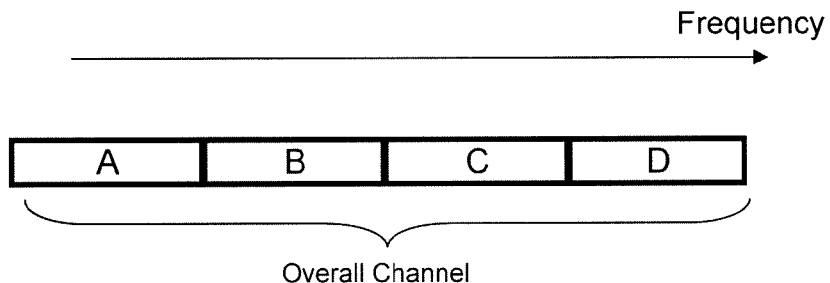
FIG. 17 is an example of a diagram depicting multiple subchannels within an overall channel and in which access is coordinated using time and frequency subchannel staggering techniques.
Figure 18:
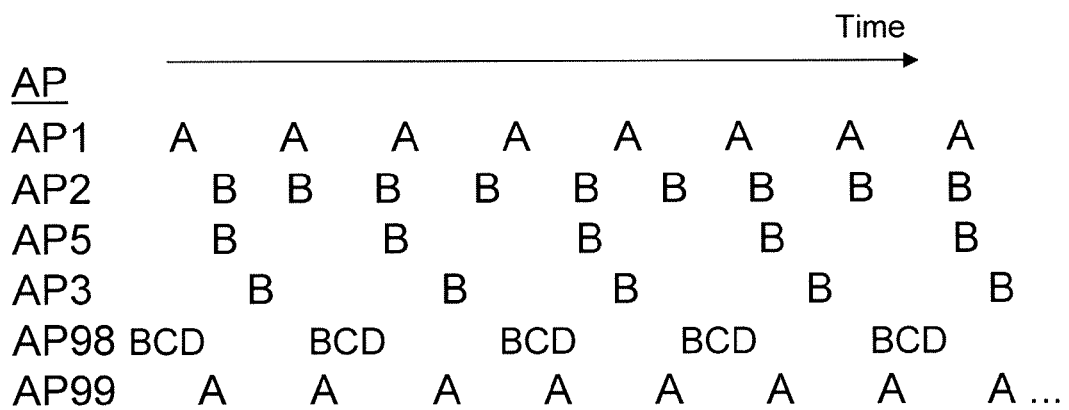
FIG. 18 is an example of a timing diagram depicting techniques for staggering the start times and frequency subchannels of isochronous bursts.
Figure 19:
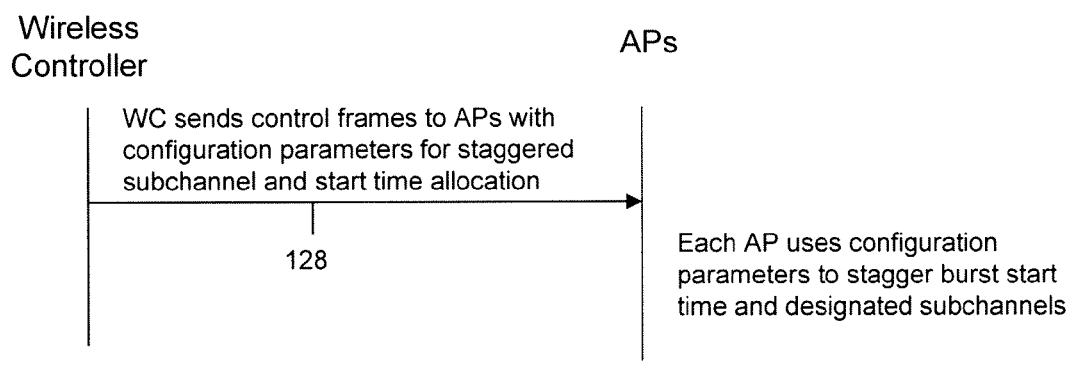
FIG. 19 is an example of a ladder diagram depicting the interaction between the wireless controller apparatus and wireless network access point devices and/or client devices to perform the techniques depicted in FIG. 18.

Reference is now made to FIGS. 17-19. While the techniques described above involve channel access coordination/scheduling based on time, this is not meant to be limiting. A further enhancement is to manage scheduling of the channel based on time and frequency. For example, under potential consideration in IEEE 802.11 ac (or with multiple logical 802.11 APs in one physical enclosure), there are multiple subchannels (e.g., four 20 MHz subchannels within an overall 80 MHz channel) with orthogonal frequency division multiple access (OFDMA)-like physical channel access. This is shown in FIG. 17 where an overall channel comprises four subchannels denoted A, B, C and D. Contention reduction (collision avoidance) may be enhanced by staggering medium access by time and by frequency (across subchannels). FIG. 18 shows an example of staggering subchannel access among a plurality of APs. In this example, AP98 is an AP that uses an aggregation of channels B, C and D for wider bandwidth (and thus higher data rate) transmission. The aggregate channel allocation would occur during time intervals when each of subchannels B, C and D are not in use by other APs, as depicted in FIG. 18.

There is an additional benefit to the technique depicted in FIG. 18 when the isochronous flows may have different periodicity due to the coder/decoders (codecs) associated with the respective flows. For example, the codec for one isochronous flow have a natural inter-burst start time of 16.6666 ms, the codec associated with another isochronous flow is aligned with 10 or 20 ms intervals, and a codec associated with still another flow (e.g., an AP transmitting a DTIM Beacon) is aligned at 102.4 ms. The WC 20 can assign the isochronous flows derived from the respective video codecs with different time bases to disjoint sets of subchannels. In other words, the WC 20 assigns bursts from isochronous flows with different periodicity to different subchannels.

FIG. 19 illustrates a ladder diagram in which at 128, the WC 20 sends a control frame to the APs with configuration parameters (schedule data) for staggered subchannel and start time allocation, which, as explained above, will cause a staggering of the transmission start times and staggered across frequency subchannels, for the isochronous flows from neighboring APs. Each AP uses the configuration parameters to the stagger burst start times in designated subchannels.

The format of the Control Frame that the WC 20 sends to APs to configure them to perform the staggered by time and subchannel technique described above in connection with FIGS. 17-19 may be the same as that presented above in connection with FIGS. 4, 6, 9 and 11, with the addition of the Subchannel IE field set forth below.

Additional Subchannel IE field of Control Frame for FIGS. 17-19

| ... |
|---|
| 0 or more Subchannel IE |

Example of Subchannel IE Field

| Subchannel Identifier | Length | Channel Bitmask |
|---|---|---|
| 1 octet | 1 octet | 2 octets |

Example of Channel Bitmask subfield in Subchannel IE Field

| Include bottom channel | Include bottom channel + 1 | ... | Include top channel − 1 | Include top channel |
|---|---|---|---|---|
| B0 | B1 | | B14 | B15 |

In the Channel Bitmask subfield, the "bottom" channel refers to the lowest frequency subchannel, e.g., subchannel A in FIG. 18 and the "top" channel refers to the highest frequency subchannel, e.g., subchannel D in FIG. 18.

To summarize the techniques depicted by FIG. 18, the schedule data (generated by the WC 20, for example) comprises staggered start times for wireless transmission bursts within each isochronous traffic flow from one or more wireless access point devices and/or one or more wireless client devices across multiple frequency channels to minimize overlap in time and frequency of the wireless transmission bursts from different isochronous flows. The isochronous flows with different periodicity are assigned to different frequency subchannels.

Figure 20:
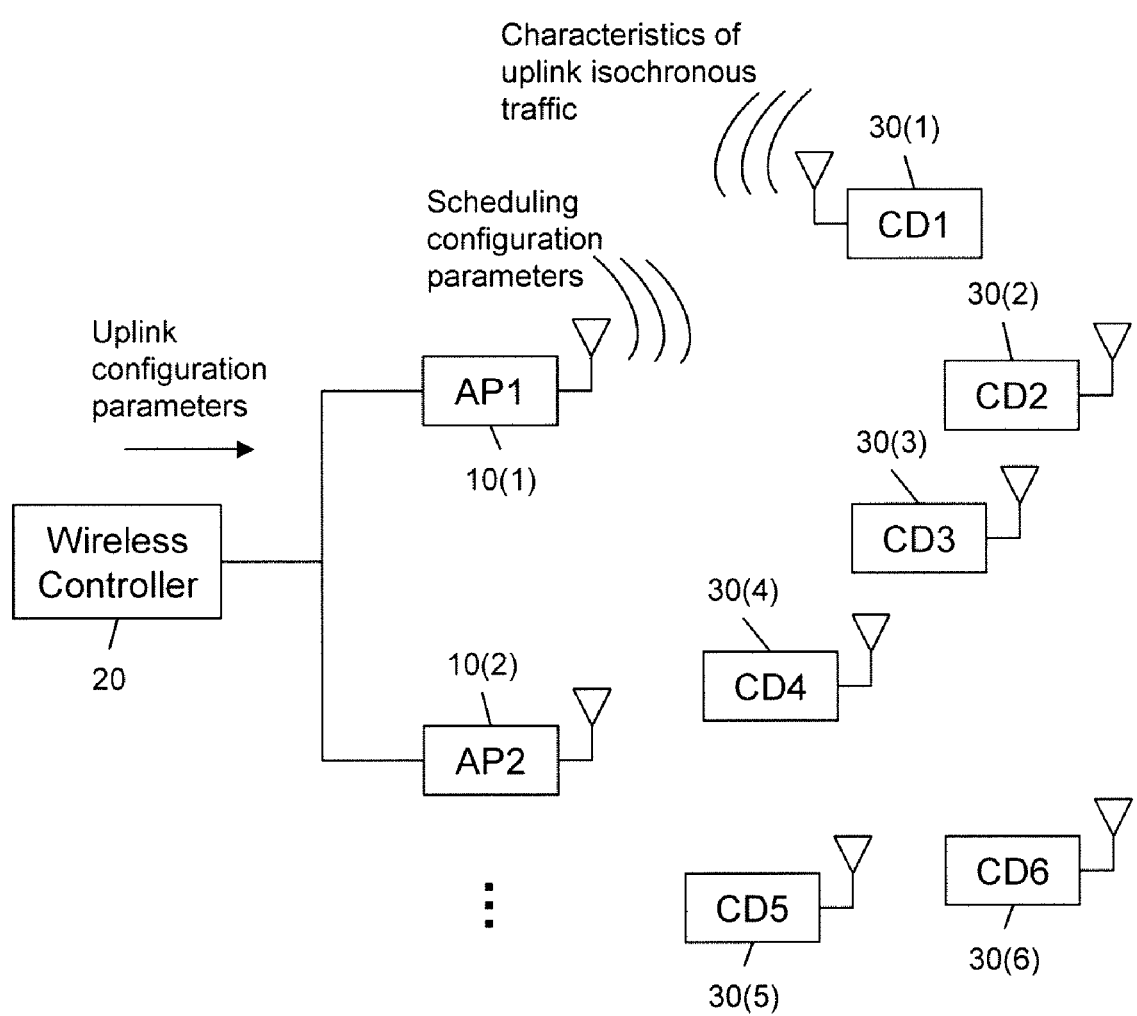
FIG. 20 is an example of a block diagram of a wireless network in which client devices are configured to perform various contention reduction techniques described herein.

Reference is now made to FIG. 20. The techniques described herein are applicable to downlink traffic (from APs to CDs) and to uplink traffic (from CDs to APs). To this end, several CDs send a message to their associated AP indicating the characteristics of its uplink isochronous traffic flow to be sent. The APs forward this message to the WC 20. The WC 20 generates scheduling configuration parameters for the CDs (e.g., burst start time with suitable start time staggering per the techniques described above in connection with FIG. 5) for the CD via exchanges between the CDs and the WC 20. For example, the WC 20 may use Traffic Specification (TSPEC) messaging techniques to send configuration messages, via the respective APs, to the CDs. A CD may indicate in a TSPEC message to the WC 20 that it is capable of supporting a staggered scheduling option.

Thus, using the techniques presented above in connection with FIGS. 5 and 20, the WC 20 can loosely schedule the start time of each isochronous burst within AP and CD flows to reduce collisions by staggering the burst start times between nearby APs and CDs. Determining the neighborness may be by proxy. For example, a CD's associated AP "stands in" for a CD and represents the CD with respect to another CD that may be within its range, or by CD-assisted measurements contained in Beacon Reports, Frame Reports, etc., as defined in IEEE 802.11k.

In the techniques described above in connection with FIGS. 12-16, it was assumed that the CDs on the uplink fend for themselves in terms of accessing the medium. However, many of these same techniques described above with respect to APs may be extended to CDs. CDs synchronize to APs to within a fraction of a slot by way of the normal TSF-sync mechanism, perhaps augmented by the IEEE 802.11v timing synchronization feature. CDs can be subframe owners (e.g., with priority P=0), have next-highest priority for a subframe (e.g., priority P=1), etc., as explained above. In addition, CDs can partake in the overhang and TXOP chaining mechanism described above.

To this end, the WC 20 keeps track of long-lived isochronous flows and AP-AP, AP-isochronous CD and isochronous CD-isochronous CD neighbor relationships, designs the superframe and subframes, and the reuse of subframes across distant APs/CDs, assigns the priorities of APs/CDs within each subframe, and reports the TXOP overhang duration. Again, the WC does not do packet scheduling, but only performs coarse-grained prioritization triggered by events (start and stop of isochronous flow and significant changes in PHY rate used for an isochronous flow).

Figure 21:
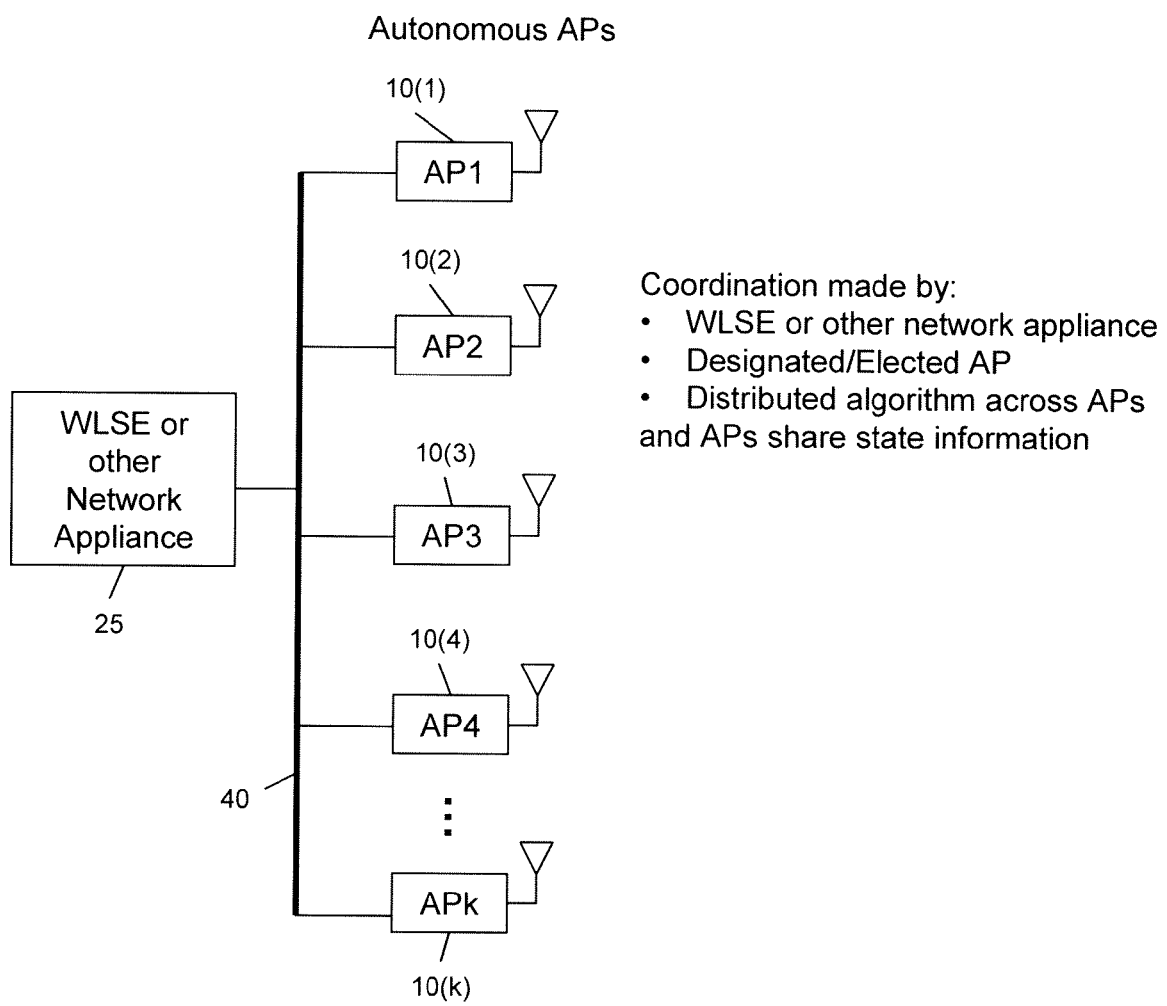
FIG. 21 is an example of a block diagram of a wireless network in which autonomous wireless network access point devices configure themselves to perform the various contention techniques described herein without a centralized wireless controller apparatus.

In yet another configuration, the techniques described herein may be coordinated in a distributed, rather than a centralized, manner as described above. Reference is now made to FIG. 21. The APs 10(1)-10(k) are so-called "autonomous" APs in that they are not controlled by a WC 20. They are deployed without a connection to a WC 20 and operate substantially autonomously. A network appliance that is configured with software to implement a WLAN solution engine (WLSE) is part of a typical WLAN deployment and it can serve to mitigate interference among autonomous APs by coordinating the scheduling of isochronous bursts from APs using any of the techniques described herein. In another form, a particular AP is elected or designated to serve as a local "controller" with respect to group of APs. In still another form, the coordination algorithms described herein are distributed across multiple APs and state information for the algorithm is shared by messages exchanged between APs. To summarize, as depicted in FIG. 21, the schedule data representing the start times for bursts associated with wireless transmission bursts from different isochronous flows may be generated from computations made at a designated AP or at multiple APs, and the APs share information pertaining to the schedule data by messages sent between the APs.

It is to be understood that the techniques described herein are applicable to isochronous traffic including video traffic as well as audio traffic. For audio traffic, the overhead of a Quiet IE per audio flow is higher. Therefore, the use of Quiet IEs for audio may be coupled to the simultaneous use of the Power Save Multi-Poll (PSMP) mode in which an AP controls when it sends audio and expects to receive audio from a CD, i.e., so-called aggregated audio.

The above description is by way of example only.

What is claimed is:

1. A method comprising:
at a controller apparatus that communicates with a plurality of wireless access point devices and/or a plurality of wireless client devices in a wireless network:
receiving from the wireless access point devices and/or wireless client devices messages indicating relatively long-lived isochronous traffic flows to be wirelessly transmitted from wireless access point devices to their associated client devices and/or from wireless client devices to their respective wireless access point devices;
determining which of the plurality of wireless access point devices and/or wireless client devices are in sufficient radio frequency proximity so as to interfere with each other;
based on the messages received from the wireless access point devices and/or wireless client devices concerning the isochronous traffic flows and the radio frequency proximity of wireless access point devices, generating schedule data representing the start times for wireless transmission bursts within each isochronous traffic flow from respective ones of the plurality of wireless access point devices and/or respective ones of the plurality of wireless client devices so as to reduce a likelihood of interference between multiple bursts of wireless transmissions for different isochronous traffic flows; and transmitting messages containing the schedule data to the plurality of wireless access point devices and/or wireless client devices.

2. The method of claim 1, wherein generating the schedule data comprises generating staggered start times for wireless transmission bursts within each isochronous traffic flow from one or more wireless access point devices and/or one or more wireless client devices to minimize overlap of the wireless transmission bursts from different isochronous flows.

3. The method of claim 1, wherein generating the schedule data comprises generating staggered start times for wireless transmission bursts of within each isochronous traffic flow from one or more wireless access point devices and/or one or more wireless client devices across multiple frequency channels to minimize overlap in time and frequency of the wireless transmission bursts from different isochronous flows.

4. The method of claim 3, wherein generating the schedule data comprises assigning isochronous flows with different periodicity to different frequency subchannels.

5. The method of claim 1, wherein generating schedule data comprises generating start times for beacon frames broadcasted by wireless access point devices to wireless client devices that are configured with a power-save mode, which beacon frames indicate that a packet that is part of a multicast isochronous traffic flow is waiting to be transmitted, and wherein the start times for the beacon frames from multiple wireless access point devices are staggered to avoid overlap of bursts of wireless transmissions for multicast isochronous traffic from multiple wireless access point devices to wireless client devices.

6. The method of claim 1, wherein generating schedule data further comprises generating data for quiet elements to be transmitted by one or more of the wireless access point devices to their associated wireless client devices to cause their associated wireless client devices to end their transmissions before the start times for wireless transmission bursts from the wireless access point devices that are determined to be in sufficient radio frequency proximity so as to interfere with each other.

7. The method of claim 1, wherein generating schedule data comprises generating data defining a superframe interval comprising a plurality of subframe intervals such that the wireless transmission of isochronous traffic is constrained to align on a burst interval that is a multiple of the superframe interval, wherein each subframe interval has a duration that is a percentage of a maximum wireless transmission burst duration, and further comprising assigning a relative priority for each of the plurality of wireless access point devices or wireless client devices to a subframe such that preference for a subframe is given to the isochronous traffic flow from a wireless access point device or wireless client device with a highest priority for that subframe.

8. The method of claim 7, wherein generating schedule data further comprises generating configuration data to cause a highest priority wireless access point device to request a transmit opportunity interval for a wireless transmission burst to complete prior to the end of the subframe to allow for an overhang interval for use for transmission of a wireless transmission burst for a next highest priority wireless access point or wireless client device on a collision-free basis and to cause other wireless access point devices or wireless client devices to, in response to reception of a message received from the wireless access point device or wireless client device associated with the highest priority isochronous traffic flow, wait a number of time slots within the subframe prior to requesting a transmit opportunity interval in the subframe.

9. The method of claim 7, wherein generating comprises generating data that causes the wireless access point device or wireless client device with the highest priority isochronous traffic flow to transmit a null message when it does not have any isochronous traffic to be transmitted so that lower priority wireless access point devices or wireless client devices can determine their turn to obtain a transmit opportunity during the subframe.

10. The method of claim 7, wherein generating schedule data comprises generating data that causes the wireless access point devices and/or wireless client devices to raise and lower its distributed channel access parameters according to its relative priority within a subframe.

11. The method of claim 1, wherein receiving, determining and generating schedule data are performed in a controller apparatus that resides in one of the plurality of wireless access point devices.

12. The method of claim 1, wherein the schedule data representing the start times for the wireless transmission bursts is generated according to computations made at a designated wireless access point device or at multiple wireless access point devices, and further comprising sharing information pertaining to the schedule data using messages sent between the wireless access point devices.

13. An apparatus comprising:
a network interface device configured to enable communications over a network to communicate with a plurality of wireless devices configured for wireless communication in a wireless network;
a processor configured to be coupled to the network interface, wherein the processor is configured to:
receive from a plurality of wireless access point devices and/or a plurality of wireless client devices in a wireless network, messages indicating relatively long-lived isochronous traffic flows to be wirelessly transmitted from wireless access point devices to their associated client devices and/or from wireless client devices to their respective wireless access point devices;
determine which of the plurality of wireless access point devices and/or wireless client devices are in sufficient radio frequency proximity so as to interfere with each other;
based on the messages received from the wireless access point devices and/or wireless client devices concerning the isochronous traffic flows and the radio frequency proximity of wireless access point devices, generate schedule data representing start times for wireless transmission bursts within each isochronous traffic flow from respective ones of the plurality of wireless access point devices and/or respective ones of the plurality of wireless client devices so as to reduce a likelihood of interference between bursts of wireless transmissions for different isochronous traffic flows; and
generate messages for transmission to the plurality of wireless network access point devices and/or wireless client devices, the messages containing the schedule data.

14. The apparatus of claim 13, wherein the processor is configured to generate the schedule data comprising staggered start times for wireless transmission bursts within each isochronous traffic flow from one or more wireless access point devices and/or one or more wireless client devices to minimize overlap of the wireless transmission bursts from different isochronous flows.

15. The apparatus of claim 13, wherein the processor is configured to generate the schedule data comprising staggered start times for wireless transmission bursts of within each isochronous traffic flow from one or more wireless access point devices and/or one or more wireless client devices across multiple frequency channels to minimize overlap in time and frequency of the wireless transmission bursts from different isochronous flows.

16. The apparatus of claim 13, wherein the processor is configured to generate schedule data comprising start times for beacon frames broadcasted by wireless access point devices to wireless client devices that are configured with a power-save mode, which beacon frames indicate that a packet that is part of a multicast isochronous traffic flow is waiting to be transmitted, and wherein the start times for the beacon frames from multiple wireless access point devices are staggered to avoid overlap of bursts of wireless transmission for multicast isochronous traffic from multiple wireless access point devices to wireless client devices.

17. The apparatus of claim 13, wherein the processor is configured to generate schedule data comprising data defining a superframe interval comprising a plurality of subframe intervals such that the wireless transmission of isochronous traffic is constrained to align on a burst interval that is a multiple of the superframe interval, wherein each subframe interval has a duration that is a percentage of a maximum wireless transmission burst duration, and to assign a relative priority for each of the plurality of wireless access point devices or wireless client devices to a subframe such that preference for a subframe is given to the isochronous traffic flow from a wireless access point device or wireless client device with a highest priority for that subframe.

18. The apparatus of claim 17, wherein the processor is configured to generate the schedule data by generating configuration data to cause a highest priority wireless access point device to request a transmit opportunity interval for a wireless transmission burst to complete prior to the end of the subframe to allow for an overhang interval for use for transmission of a wireless transmission burst for a next highest priority wireless access point or wireless client device on a collision-free basis and to cause other wireless access point devices or wireless client devices to, in response to reception of a message received from the wireless access point device or wireless client device associated with the highest priority isochronous traffic flow, wait a number of time slots within the subframe prior to requesting a transmit opportunity interval in the subframe.

19. The apparatus of claim 17, wherein the processor is configured to generate the schedule data by generating data that causes the wireless access point device or wireless client device with the highest priority isochronous traffic flow to transmit a null message when it does not have any isochronous traffic to be transmitted so that lower priority wireless access point devices or wireless client devices can determine their turn to obtain a transmit opportunity during the subframe.

20. The apparatus of claim 17, wherein the processor is configured to generate the schedule data by generating data that causes the wireless access point devices and/or wireless client devices to raise and lower its distributed channel access parameters according to its relative priority within a subframe.

21. The apparatus of claim 13, wherein the processor is configured to generate schedule data comprising data for quiet elements to be transmitted by one or more of the wireless access point devices to their associated wireless client devices to cause their associated wireless client devices to end their transmissions before the start times for wireless transmission bursts from the wireless access point devices that are determined to be in sufficient radio frequency proximity so as to interfere with each other.

22. A wireless access point device comprising the apparatus of claim 13.

23. A non-transitory processor readable medium storing instructions that, when executed by a processor, cause the processor to:
receive from a plurality of wireless access point devices and/or wireless client devices operating in a wireless network, messages indicating relatively long-lived isochronous traffic flows to be wirelessly transmitted from wireless access point devices to their associated client devices and/or from wireless client devices to their respective wireless access point devices;
determine which of the plurality of wireless access point devices and/or wireless client devices are in sufficient radio frequency proximity so as to interfere with each other;
based on the messages received from the wireless access point devices and/or wireless client devices concerning the isochronous traffic flows and the radio frequency proximity of wireless access point devices, generate schedule data representing the start times for wireless transmission bursts within each isochronous traffic flow from respective ones of the plurality of wireless access point devices and/or respective ones of the plurality of wireless client devices so as to reduce a likelihood of interference between multiple bursts of wireless transmissions for different isochronous traffic flows; and
generate messages for transmission to the plurality of wireless network access point devices and/or wireless client devices, the messages containing the schedule data.

24. The non-transitory processor readable medium of claim 23, wherein the instructions that cause the processor to generate the schedule data comprise instructions to cause the processor to generate staggered start times for wireless transmission bursts within each isochronous traffic flow from one or more wireless access point devices and/or one or more wireless client devices to minimize overlap of the wireless transmission bursts from different isochronous flows.

25. The non-transitory processor readable medium of claim 23, wherein the instructions that cause the processor to generate the schedule data comprise instructions that cause the processor to generate data for quiet elements to be transmitted by one or more of the wireless access point devices to their associated wireless client devices to cause their associated wireless client devices to end their transmissions before the start times for wireless transmission bursts from the wireless access point devices that are determined to be in sufficient radio frequency proximity so as to interfere with each other.

26. The non-transitory processor readable medium of claim 23, wherein the instructions that cause the processor to generate the schedule data comprise instructions that cause the processor to generate data defining a superframe interval comprising a plurality of subframe intervals such that the wireless transmission of isochronous traffic is constrained to align on a burst interval that is a multiple of the superframe interval, wherein each subframe interval has a duration that is a percentage of a maximum wireless transmission burst duration, and further comprising instructions that cause the processor to assign a relative priority for each of the plurality of wireless access point devices or wireless client devices to a subframe such that preference for a subframe is given to the isochronous traffic flow from a wireless access point device or wireless client device with a highest priority for that subframe.

27. The non-transitory processor readable medium of claim 26, wherein the instructions operable to generate the schedule data comprise instructions operable to generate configuration data to cause a highest priority wireless access point device to request a transmit opportunity interval for a wireless transmission burst to complete prior to the end of the subframe to allow for an overhang interval for use for transmission of a wireless transmission burst for a next highest priority wireless access point or wireless client device on a collision-free basis and to cause other wireless access point devices or wireless client devices to, in response to reception of a message received from the wireless access point device or wireless client device associated with the highest priority isochronous traffic flow, wait a number of time slots within the subframe prior to requesting a transmit opportunity interval in the subframe.

28. The non-transitory processor readable medium of claim 26, wherein the instructions operable to generate the schedule data comprise instructions operable to generate data that causes the wireless access point device or wireless client device with the highest priority isochronous traffic flow to transmit a null message when it does not have any isochronous traffic to be transmitted so that lower priority wireless access point devices or wireless client devices can determine their turn to obtain a transmit opportunity during the subframe.

29. The non-transitory processor readable medium of claim 23, wherein the instructions operable to generate the schedule data comprise instructions operable to generate start times for beacon frames broadcasted by wireless access point devices to wireless client devices that are configured with a power-save mode, which beacon frames indicate that a packet that is part of a multicast isochronous traffic flow is waiting to be transmitted, and wherein the start times for the beacon frames from multiple wireless access point devices are staggered to avoid overlap of bursts of wireless transmissions for multicast isochronous traffic from multiple wireless access point devices to wireless client devices.

* * * * *